United States Patent [19]

Dicky

[11] Patent Number: 5,152,469
[45] Date of Patent: Oct. 6, 1992

[54] MACHINE FOR SHREDDING RUBBER TIRES AND OTHER SOLID WASTE MATERIAL

[75] Inventor: John Dicky, N. Tonawanda, N.Y.

[73] Assignee: Columbus McKinnon Corporation, Amherst, N.Y.

[21] Appl. No.: 723,743

[22] Filed: Jul. 1, 1991

[51] Int. Cl.$^5$ .......................................... B02C 18/18
[52] U.S. Cl. ................................. 241/236; 241/166; 241/295
[58] Field of Search ............... 241/166, 167, 242, 294, 241/243, 295, DIG. 31, 235, 236

[56] References Cited

U.S. PATENT DOCUMENTS

| | | |
|---|---|---|
| 3,931,935 | 1/1976 | Holman . |
| 3,991,944 | 11/1976 | Balkoff . |
| 4,134,556 | 1/1979 | Ehrlich et al. . |
| 4,374,573 | 2/1983 | Rouse et al. . |
| 4,441,434 | 4/1984 | Howard ........................... 241/295 X |
| 4,607,800 | 8/1986 | Barclay . |
| 4,627,581 | 12/1986 | Holiman et al. ................. 241/236 X |
| 4,776,249 | 10/1988 | Barclay .................... 241/DIG. 31 X |
| 4,778,114 | 10/1988 | Panning .......................... 241/166 X |
| 4,901,929 | 2/1990 | Barclay ............................ 241/236 |

FOREIGN PATENT DOCUMENTS

| | | |
|---|---|---|
| 3323191 | 1/1985 | Fed. Rep. of Germany ...... 241/166 |
| 2158366 | 11/1985 | United Kingdom . |

*Primary Examiner*—Mark Rosenbaum
*Attorney, Agent, or Firm*—Bean, Kauffman & Spencer

[57] ABSTRACT

There is disclosed a tire shredding machine of the type having oppositely rotating rotors mounting interdigitated cutting elements, which is particularly adapted for use in the further reduction of relatively large size rubber chips presently produced by use of commercially available primary tire shredding machines. The present machine incorporates an improved segmented knife retention assembly and a stripper or knife cleaning assembly.

16 Claims, 5 Drawing Sheets

MACHINE FOR SHREDDING RUBBER TIRES AND OTHER SOLID WASTE MATERIAL

BACKGROUND OF THE INVENTION

The present invention generally relates to shredding, comminuting, shearing or chopping solid materials, such as scrap vehicle tires, scrap insulated electrical conductors; used containers; and other solid waste materials required to be reduced into pieces prior to permanent disposal, recycling or other utilization.

Typically, prior machines for shredding tires or other solid waste materials employ a pair of oppositely rotating rotors fitted with interdigitated cutting discs, wherein the cutting discs on each rotor are maintained in spaced relation axially thereof by spacer rings. In order to facilitate maintenance of these machines, it has been common practice to fabricate each cutting disc from a mounting disc, which is keyed for rotation with a drive shaft of the rotor and has a peripheral surface formed with a plurality of uniformly arranged pockets or mounting recesses, and a plurality of cutter knives individually, removably clamped within the pockets by screwed threaded mounting bolts extending radially inwardly through the cutter knives and into the mounting disc. Material tending to collect between adjacent cutting discs is removed by stationary comb-like stripper plates or driven stripper rollers arranged in interdigitated relation with the cutting discs. Comminuted material may be passed through a screening or classifying device and, if required, again passed between the rotors until the materials are reduced to a given predominating size.

Machines of the type described are constructed and operated to reduce tires to pieces having a predominating size whose maximum dimension is determined by the widthwise or axial dimensions of the cutting discs. Typically, this maximum dimension is about two inches in that the size of the mounting bolts required to clamp the cutter knives to the mounting disc effectively limits the minimum widthwise dimension of the knives, and thus the cutting discs, to about two inches.

Machines of this general construction are disclosed by way of example in U.S. Pat. Nos. 3,931,935; 4,684,071 and 4,854,508.

SUMMARY OF THE INVENTION

The present invention is directed to improvements in machines for shredding solid waste materials of the type employing a pair of oppositely rotating rotors fitted with interdigitated cutting discs, wherein the cutting discs are maintained in axial spaced relation by spacer rings and each includes a plurality of removably mounted cutter knives.

More specifically, the present invention is directed to an improved cutter knife retention assembly for shredding machines of the type described, by which the widthwise dimension of the cutter knives can be substantially reduced in comparison to cutter knives typically employed in prior machines, and a knife cleaning assembly particularly adapted for use in machines fitted with the present knife retention assembly.

In a preferred form of the present invention, each rotor includes a drive shaft to which are keyed one or more drive segments extending axially of the drive shaft intermediate a fixed abutment and an adjustable clamp. Each drive segment has a peripheral surface of generally saw tooth configuration defined by uniformly arranged pockets or mounting recesses and serves to mount sets of cutter knives spaced one from another axially of the drive segment by spacer rings having inner surfaces sized and shaped to slidably engage with the peripheral surface of the drive segment. The individual cutter knives of each set are removably inserted one within each of the pockets of the drive segment and cooperating aperture and pin means serve to restrain the cutter knives against radial separating movements from within the pockets, while permitting separating movement of the cutter knives from restraining engagement with the spacer rings in a direction axially of the drive segment.

The present stripper or knife cleaning assembly includes a comb-like stripper plate associated with each rotor and supported for swinging movement between a normal use position in which its teeth are disposed in an interdigitated relation with the sets of cutter knives of such rotor and a withdrawn position in which such teeth may be cleaned or replaced.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
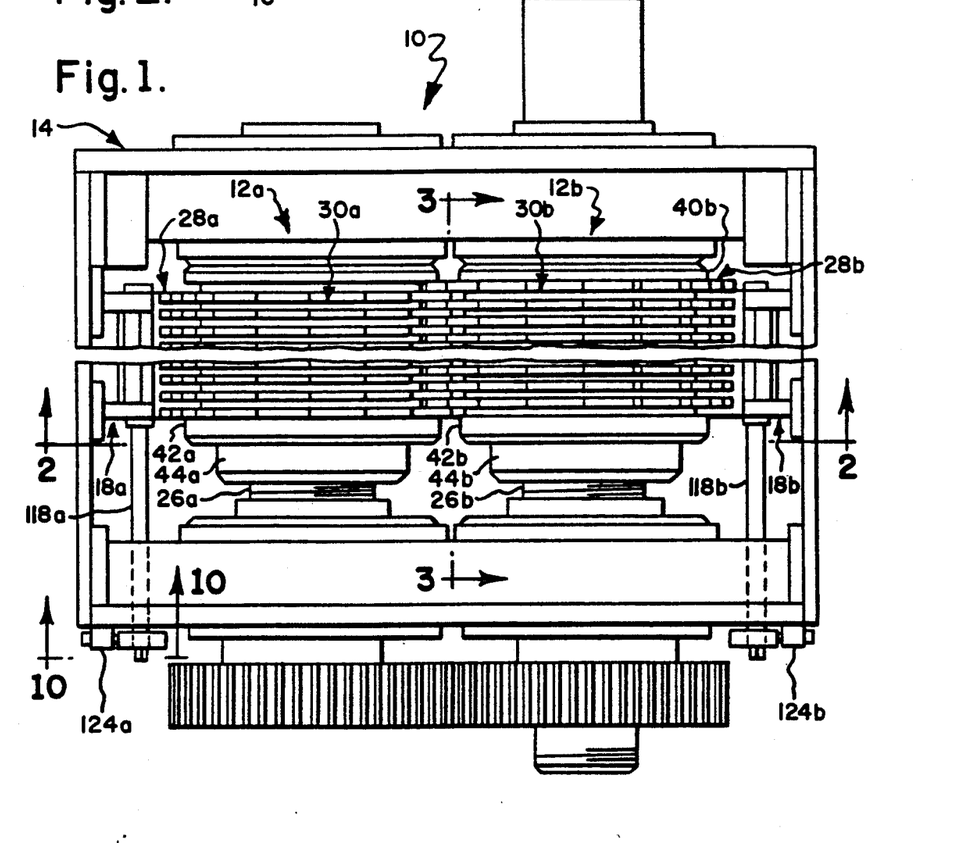
FIG. 1 is a fragmentary top plan view showing a pair of oppositely rotating rotors mounted within a solid waste shredding machine.
Figure 2:
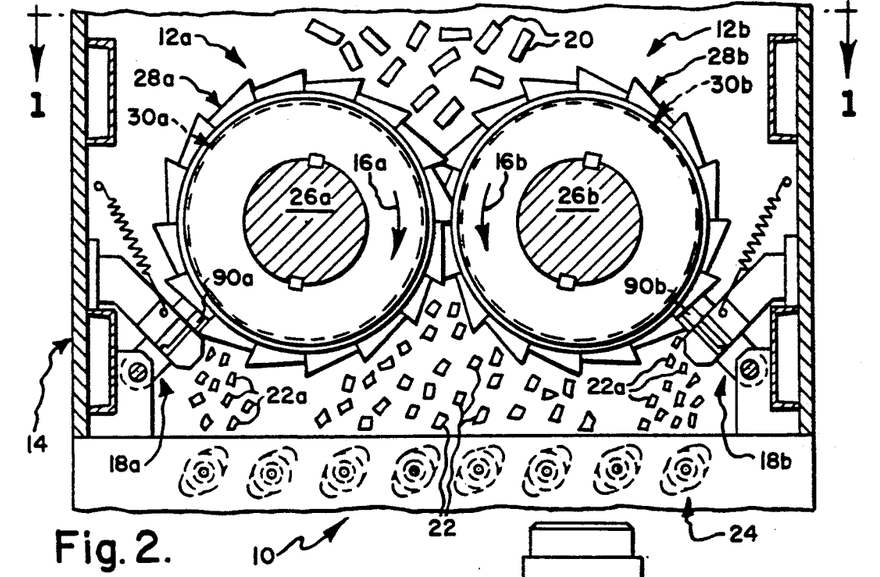
FIG. 2 is a sectional view taken generally along the line 2—2 in FIG. 1.

Reference is first made to FIGS. 1 and 2, wherein a shredding machine of the present invention is generally designated as 10, and shown as including a pair of parallel driven comminuting rotors 12a and 12b end supported within a machine housing 14 for rotation about parallel axes and in opposite directions 16a and 16b, respectively; and a pair of stripper or knife cleaning assemblies 18a and 18b mounted on the housing for cooperation with rotors 12a and 12b, respectively. Solid material to be processed, such as pieces of rubber 20 produced during a primary tire shredding operation, may be suitably conveyed and introduced into machine 10 downwardly towards the bite defined by rotors 12a and 12b, as illustrated in FIG. 2. Reduced size pieces 22 of solid material produced by operation of the rotors, together with reduced size pieces 22a removed from the rotors by operation of stripper assemblies 18a and 18b, may be passed through a conventional screening or classifying device 24 prior to being conveyed to suitable collection or further processing areas or, if desired, pieces exceeding a desired size may be transferred to the inlet of machine 10 for reprocessing.

As with known shredder machines, rotors 12a and 12b generally include rotor drive shafts 26a and 26b, a plurality of cutting discs 28a and 28b and a plurality of spacer rings 30a and 30b, wherein the cutting discs and spacer rings are sized and arranged such that the cutting discs of the rotors are interdigitated in the manner best shown in FIG. 1.

Figure 3:
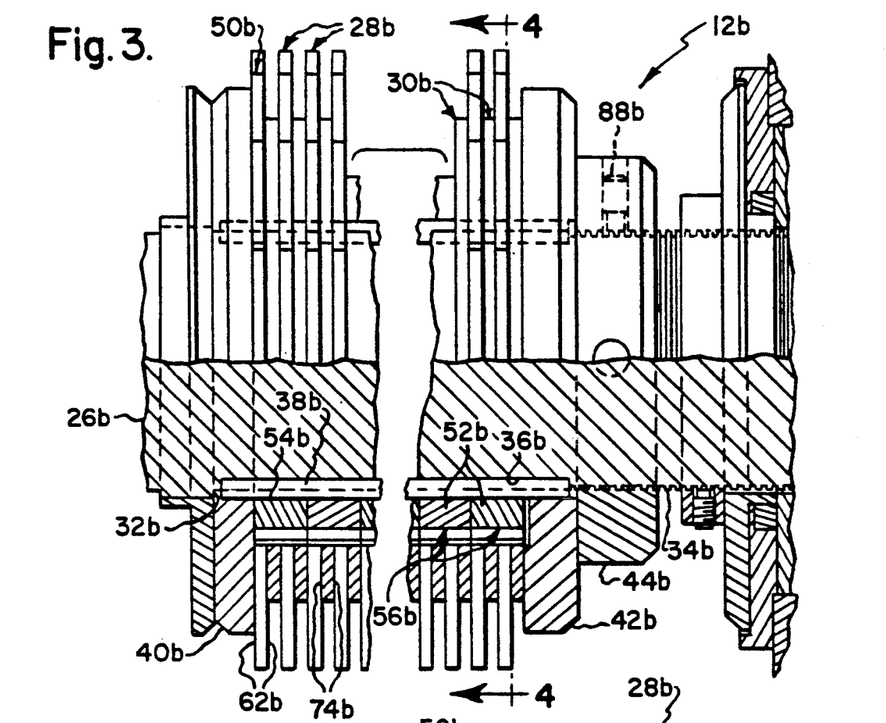
FIG. 3 is an enlarged fragmentary view taken generally along the line 3—3 in FIG. 1.
Figure 4:
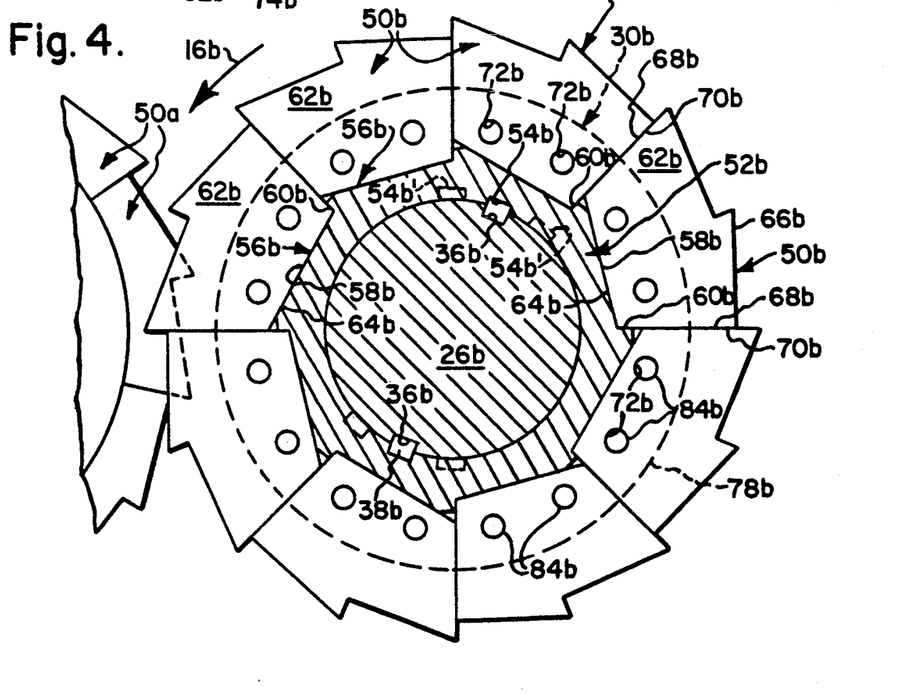
FIG. 4 is a sectional view taken generally along the line 4—4 in FIG. 3.
Figure 5:
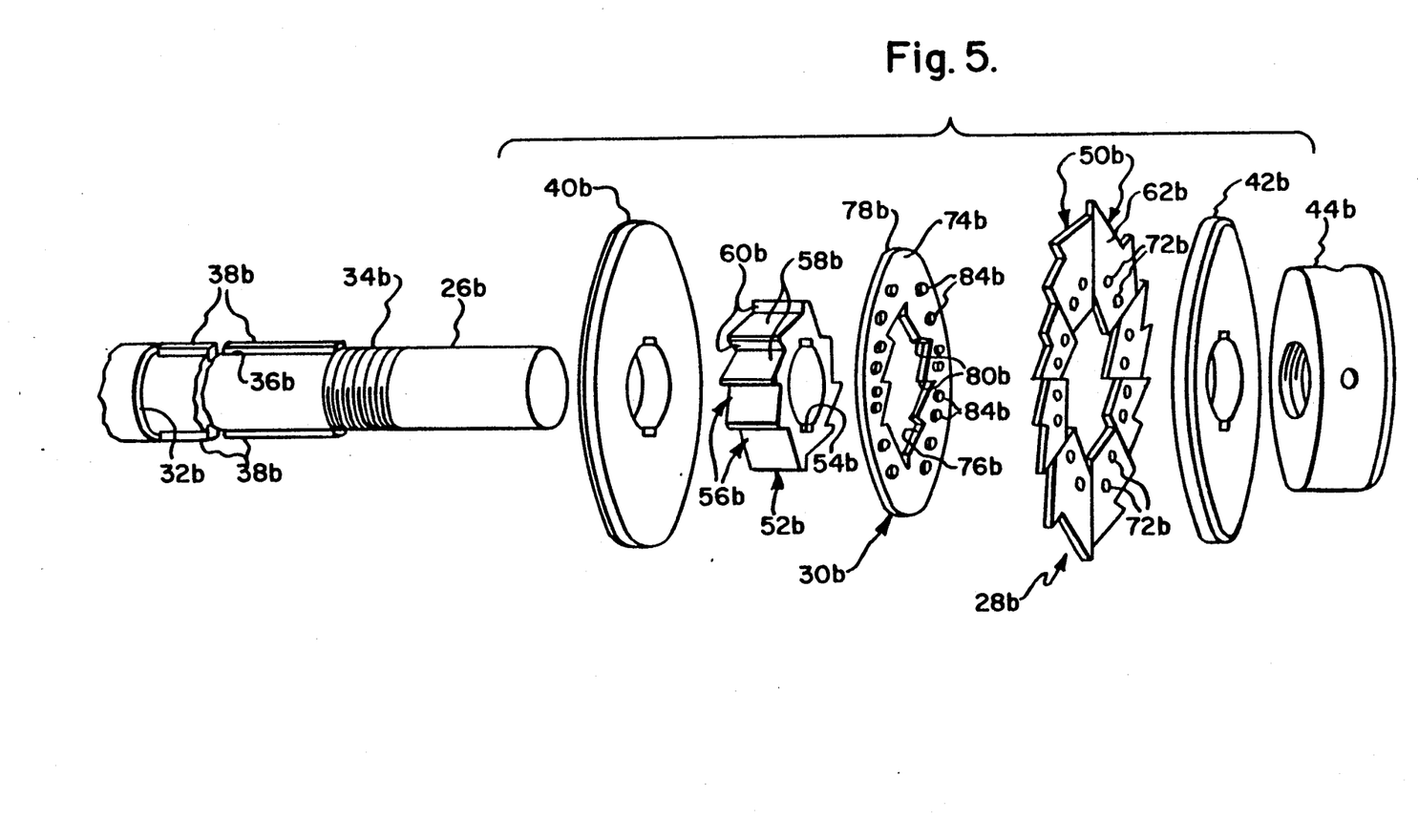
FIG. 5 is an exploded perspective view showing elements of one of the rotors.

In accordance with the present invention, rotors 12a and 12b depart from prior constructions in the manner best shown in FIGS. 3, 4 and 5 for the case of rotor 12b. More specifically, drive shaft 26b is shown as being generally cylindrical with one end enlarged to define an annular abutment surface 32b, a second or opposite end provided with a screw threaded portion 34b and an intermediate portion formed with one or more slots 36b for a receiving key(s) 38b. A stack of alternately arranged cutting discs 28b and spacer rings 30b are intended to be releasably clamped between first and second clamping washers 40b and 42b, wherein washer 40b is disposed in engagement with abutment surface 32b and one end of the stack, washer 42b is disposed in engagement with an opposite end of the stack and the whole assembly releasably retained in position by a clamp nut 44b adjustably supported by screw threaded portion 34b.

Further in accordance with the present invention, cutting discs 28a and 28b and spacer rings 30a and 30b depart from prior constructions as regards their construction and mode of attachment. More specifically, as shown in FIGS. 3-5 for the case of cutting discs 28b, the cutting discs are defined by sets of cutter knives 50b supported together with spacer rings 30b on one or more drive segments 52b, which are slidably supported on drive shaft 26b and fixed for rotation therewith by key(s) 38b. Preferably, multiple drive segments 52b are employed in order to both simply manufacture and to allow, if desired, the sets of cutter knives 50b to be staggered annularly of drive shaft 26b by providing adjacent drive segments or adjacent groups of drive segments with annularly offset slots 54b, 54b' and 54b" in the manner shown in FIG. 4.

Each drive segment 52b has a saw toothed peripheral surface defined by axially extending mounting pockets or recesses 56b formed from generally planar, outwardly facing positioning surfaces 58b and generally planar, radially extending abutment or drive surfaces 60b, which face in the direction of shaft rotation 16b.

Cutter knives 50b of each set are formed from hardened metal plates having a uniform thickness, as measured between parallel, oppositely facing side or abutment surfaces 62b. Cutter knives are peripherally bounded by an inner positioning edge 64b, an outer tooth defining or cutting edge 66b, a leading edge 68b and a trailing edge 70b, and are further provided with at least one aperture 72b extending normal to side walls 62b. Cutter knives 50b of each set are intended to be disposed one within each of pockets 56b with their trailing edges 70b disposed in engagement with abutment surfaces 60b and at least in close proximity to leading edge 68b of a next adjacent cutter knife trailing in the direction of shaft rotation 16b, with their positioning edges 64b disposed in engagement with positioning surfaces 58b, and with their oppositely facing side surfaces 62b arranged in a coplanar relationship and to extend radially of the axis of rotation of drive shaft 26b.

Further in accordance with the preferred form of the invention, spacer rings 30b are formed from metal plates having a uniform thickness, as measured between parallel, oppositely facing side or abutment surfaces 74b. One of spacer rings 30b is best shown in FIG. 5 as having an inner mounting edge 76b preferably shaped to conform to the shape of the outer peripheral surface of drive segment 52b, whereby to permit sliding movement of the spacer ring lengthwise of the drive segment and axially of drive shaft 26b and to arrange its annular outer edge 78b concentrically of the axis of rotation of the drive shaft. While the configuration of inner mounting edge 76b may depart from that of the outer surface of drive segment 52b, it is desirable that such mounting edge include, at least, radially extending trailing abutment or drive edges 80b arranged for facing engagement with drive segment abutment surfaces 60b. Again referring to FIG. 5, it will be understood that spacer ring 30b carries a plurality of annularly spaced parallel mounting pins 84b arranged to project normal from one of its side surfaces 74b for slidable receipt within apertures 72b of an adjacent set of cutter knives 50b when received within pockets 56b of drive segment 52b.

Rotor 12b is assembled by first placing first clamping washer 40b in engagement with abutment surface 32b and then sliding a required number of drive segments 52b one at a time onto drive shaft 26b with the sets of cutter knives 50b and spacer rings 30b associated with each drive segment being either preassembled thereon or assembled after each of the drive segments is installed. Thereafter, second clamping washer 42b is placed against the stack of drive segments, sets of cutter knives and spacer rings and compressive force applied thereto by threading clamp nut 44b onto threaded portion 34b. Unintended loosening of clamp nut 44b may be prevented by providing same with a lock or set screw 88b extending radially therethrough for engagement with drive shaft 26b. With rotor 12b in assembled condition, movement of cutter knives 50b of each set radially outwardly of drive shaft 26b from within pockets 56b is constrained by engagement of pins 84b of an adjacent spacer ring 30b within apertures 72b of such cutter knives. The individual cutter knives 50b are driven for rotational movement with drive shaft 26b by engagement of their trail edges 70b by abutment surfaces 60b and/or engagement of pins 84b within their apertures 72b, depending upon manufacturing tolerances. The clamping of each set of cutter knives 50b between adjacent spacer rings 30b and/or between a spacer ring and clamping washers 40b or 42b maintains side surfaces 62b of the cutter knives of such set in coplanar relationship and in properly spaced relationship, as required to receive cutter knives 50a therebetween as shown in FIG. 1.

When any one of cutter knives 50a or 50b becomes broken or excessively worn, it may be replaced by loosening clamp nuts 44a and 44b sufficiently to permit cutter knife sets and spacer rings intermediate such cutter knife and the clamp nuts to be manually moved lengthwise of drive shaft 26a and 26b towards the clamp nuts, until a sufficient space is created as will allow the broken or worn cutter knife to be slid off of its supporting pins and when freed therefrom withdrawn radially from its associated rotor. A replacement cutter knife can be installed by reversing this operation. Alternatively, machine 10 may be constructed to allow rotors 12a and 12b to be moved apart sufficiently to withdraw their sets of cutter knives from interdigitated relation, whereby requiring only the rotor with a broken cutter knife to be worked upon.

The present invention has the advantage that cutter knives 50a and 50b can be formed of flat plate stock material whose thickness is determined by the size of pieces 22 desired to be produced. Cutter knives having thicknesses or widths on the order of ½ inch are readily achievable with the minimum thickness of the cutter knives being limited only by the strength of available materials from which the cutter knives and their retaining pins are fabricated.

The present construction also has the advantage that the facing/overlapping surfaces of cutting discs 28a and 28b are defined wholly by the side surfaces of cutter knives 50a and 50b, thereby negating the requirement in prior machines of covering such facing/overlapping surfaces with separate wear plates or rings. A further advantage of the present construction, as compared to prior shredding machines, is that no part of the cutter knife retention system is exposed to wear or has access thereto blocked by plugging with particles of waste material.

Figure 6:
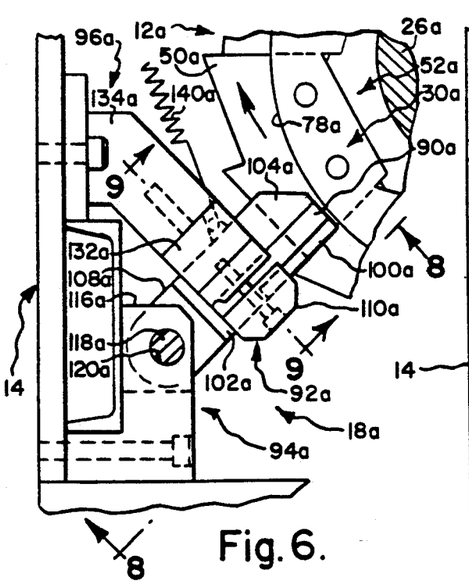
FIG. 6 is an enlarged view of the left hand stripper plate shown in FIG. 2.
Figure 7:
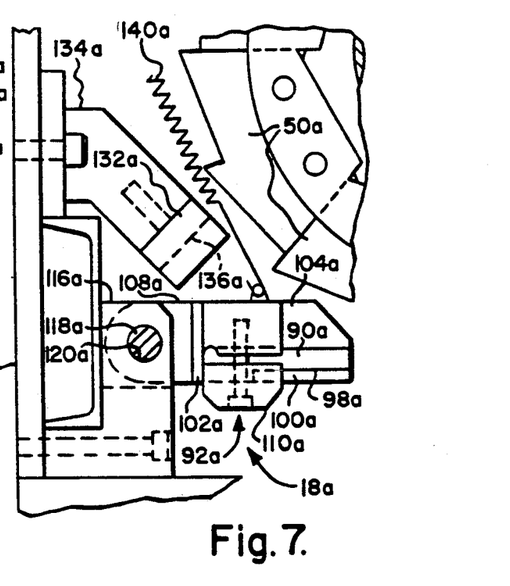
FIG. 7 is a view similar to FIG. 6, but showing the stripper plate in its withdrawn position.
Figures 8, 9, 12, 13:
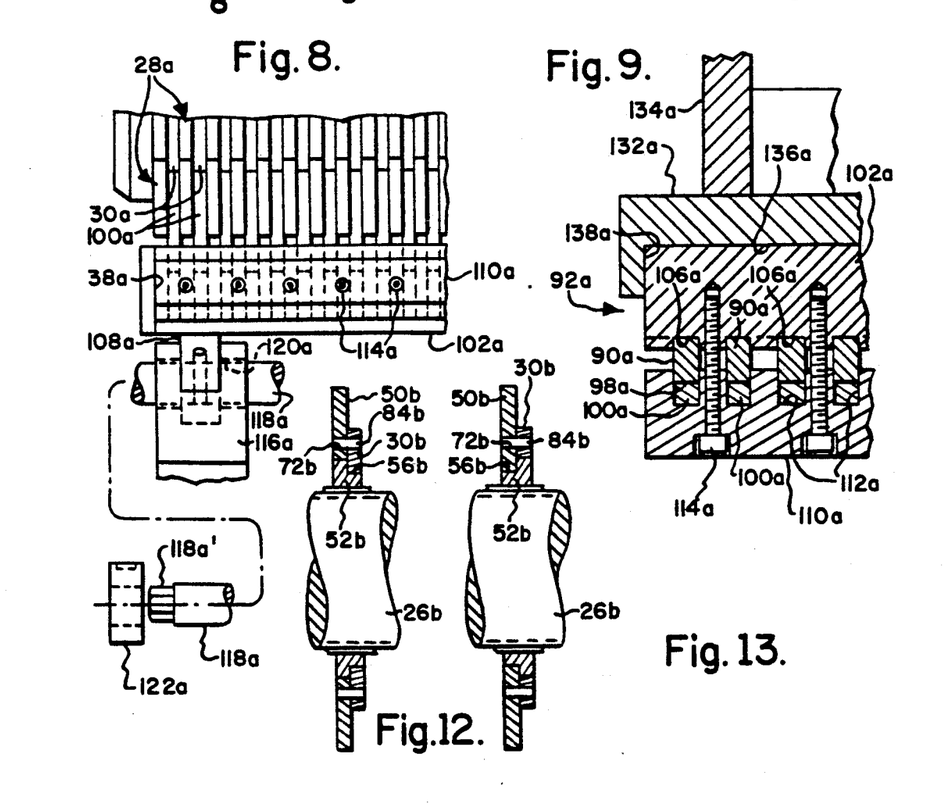
FIG. 8 is a sectional view taken generally along the line 8—8 in FIG. 6.
FIG. 9 is a sectional view taken generally along the line 9—9 in FIG. 6.
FIGS. 12 and 13 are sectional views showing exemplary alternative constructions of the present knife retention assembly.

Stripper cleaning assemblies 18a and 18b are of mirror image construction, and generally include, as shown for the case of assembly 18a in FIGS. 6-11, a plurality of stripper fingers 90a; a finger clamping assembly 92a; mounting means 94a for mounting the clamping assembly and the stripper fingers for pivotal movement about a pivot or hinge axis disposed parallel between the cleaning or operative position shown in FIGS. 6 and 8 and a withdrawn or inoperative position shown in FIG. 7; and a locating assembly 96a for supporting the clamping assembly in its cleaning position.

Stripper fingers 90a are shown in FIGS. 6-9 as being in the form of elongated bars of generally rectangular cross section, which are formed with cutouts or notches 98a for receiving alloy inserts 100a, which perform the cleaning operation.

Clamping assembly 92a is also best shown in FIGS. 6-9 as including an elongated mounting bar 102a having a plurality of finger supporting projections 104a projecting normal thereto and arranged in a uniformly spaced relation lengthwise of the mounting bar, a plurality of finger positioning recesses 106a aligned one with each of the supporting projections and a plurality of hinge ears 108a; a clamping bar 110a having a plurality of clamping recesses 112a arranged for alignment one with each of positioning recesses 106a; and a plurality of clamping bolts 114a for use in releasably attaching the clamping bar to the mounting bar and thereby clamping stripper fingers 90a within aligned recesses 106a and 112a in overlying engagement with projections 104a to define a generally comb-shaped member.

Figure 10:
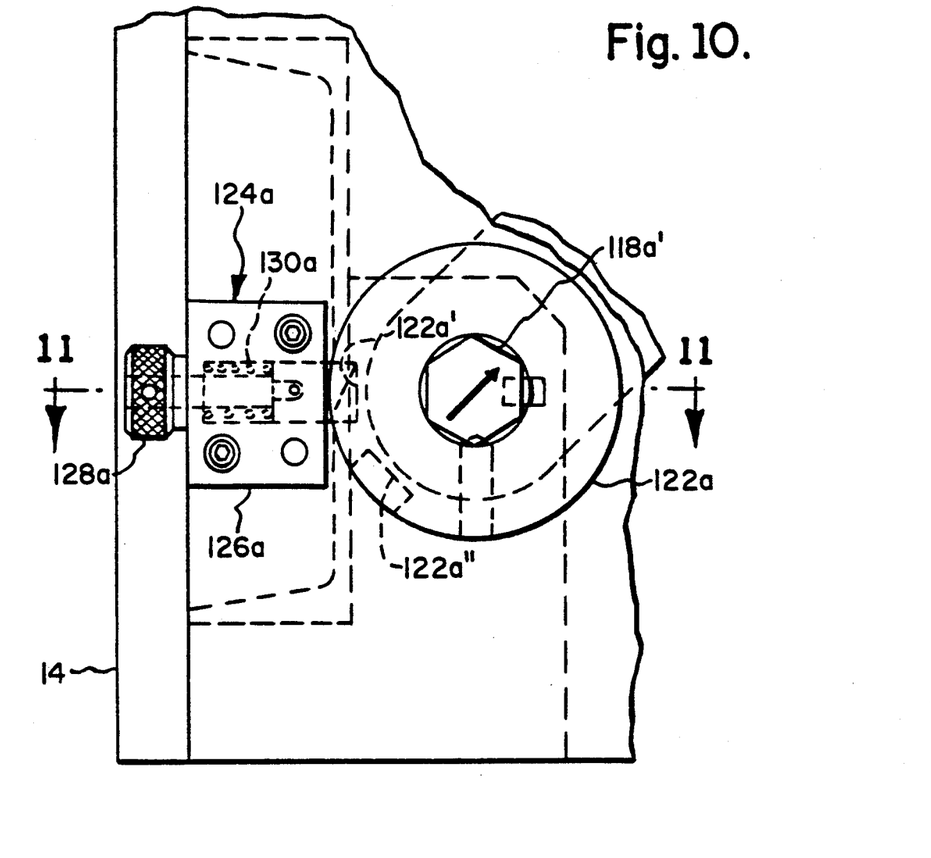
FIG. 10 is an enlarged view showing a latch for the knife cleaning assembly.
Figure 11:
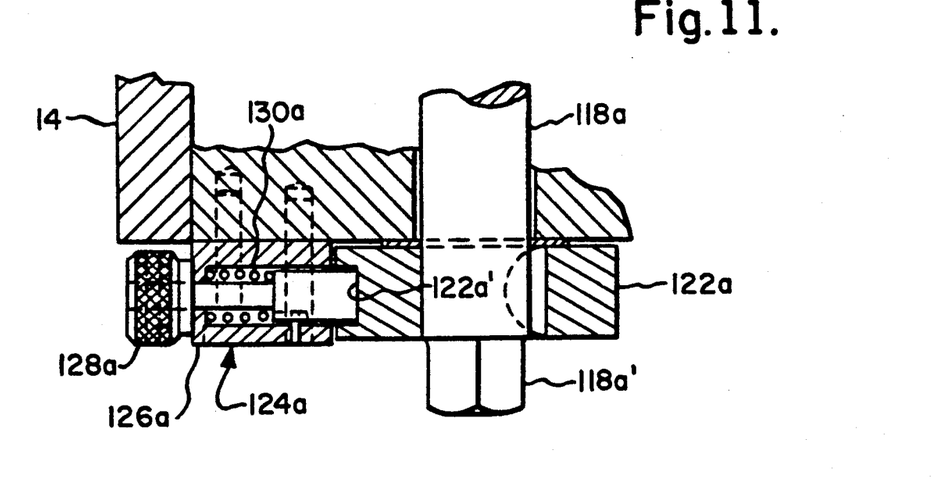
FIG. 11 is a sectional view taken generally along the line 11—11 in FIG. 10.

Mounting means 94a includes a plurality of hinge ears 116a fixed to machine housing 14; a pivot shaft 118a, which is preferably fixed within bore openings, not shown, provided in hinge ears 108a and journalled within bearing openings 120a provided in hinge ears 116a; and a latch assembly including a latch hub 122a keyed to the pivot shaft and a latch device 124a fixed to machine housing 14. Latch hub 122a is shown in FIGS. 10 and 11 as being formed with radially opening, annularly spaced latch recesses 122a' and 122a" whose positions correspond to the cleaning and withdrawn positions of the stripper fingers shown in FIGS. 6 and 7, respectively. Latch device 124a is also shown in FIGS. 10 and 11 as including a housing or guide 126a serving to slidably mount a manually operable latch bar 128a, which is normally biased by a spring 130a for receipt within latch recesses 122a' and 122a" for purposes of releasably latching stripper fingers 90a alternatively in their cleaning and withdrawn positions. Upon retraction of the latch bar from within the latch recesses, pivot shaft 118a may be rotated for purposes of moving stripper fingers 90a by a wrench, not shown, removably fixed to its free end 118a'.

Locating assembly 96a includes a generally U-shaped abutment bracket 132a, which is fixed to machine housing 14 by suitable brackets 134a and disposed such that a first or base surface 136a is arranged to be engaged by mounting bar 102a to define the cleaning position of stripper fingers 90a and facing surfaces or opposite leg surfaces 138a engage with opposite ends of the mounting bar to maintain the stripper fingers in an essentially uniformly spaced relationship relative to cutting discs 28a when inserted therebetween. Preferably, one or more springs 140a are provided to normally bias mounting bar 102a into engagement with base 136a.

In FIG. 12, an alternative knife retention assembly is shown, wherein a drive segment 52b is axially sized to accommodate only one spacer ring 30b and one set of cutter knives 50b. Further, in this form of the invention, drive segment 52b is formed with mounting pockets 56b extending only throughout one half of its length, which are arranged in keyed relationship only with spacer ring 30b; the set of cutter knives being free for movement axially and radially of the drive segment and coupled for rotation therewith only by the presence of apertures 72b and pins 84b.

FIG. 13 shows a further alternative knife retention assembly, which is similar to that of FIG. 12 except that mounting pockets 56b are arranged to receive the individual cutter knives 50b of the set, and spacer ring 30b is slidably and rotatably mounted on drive segment 52b. In this embodiment, apertures 72b and pins 84b serve only to prevent radially directed separating movement of the cutter knives from within their mounting pockets.

In operation, stripper fingers 90a and 90b are placed in their cleaning positions shown in FIGS. 2 and 6 before initiation of rotation of rotors 12a and 12b to perform a comminuting operation and thereafter serve to remove pieces 22a, which may tend to become wedged between adjacent pairs of cutting discs 28a and 28b. When it is desired to replace a worn or broken cutter knife 50a or 50b in the manner previously described, rotation of rotors 12a and 12b is first arrested and then stripper fingers 90a and 90b moved into their withdrawn positions to permit required movements of cutting discs 28a,28b and spacer rings 30a,30b axially of drive shafts 26a,26b for cutter knife removal installation purposes. At that time, any excessively worn or broken stripper finger may be replaced, and any part of the comminuted material, such as strands of wire from the steel belting of vehicle tires which might tend to become wrapped around the stripper fingers, may be removed. While manual force applied to one end of pivot shafts 118a and 118b has been disclosed for use in rotating the stripper fingers into their withdrawn positions, it may be necessary or desirable to more positively drive the stripper fingers into their withdrawn positions by imparting oppositely directed rotations to rotors 12a and 12b, after release of latch devices 124a and 124b, for those situations where elements of the comminuted material has become wedged between the stripper fingers and facing surfaces of an associated pair of cutting discs.

It is contemplated that shredding machine 10 may be provided with safety features, not shown, such as suitable interlocks and sensors which prevent rotation of rotors 12a and 12b when stripper fingers 90a and 90b are not properly positioned in their cleaning positions and/or uncontrolled movements of the stripper fingers into their withdrawn positions during a normal comminuting operation.

What is claimed is:

1. In a comminution apparatus having a pair of parallel intermeshing cutter rotors each including a cutter drive shaft, a plurality of cutting discs, a plurality of spacers for axially separating said cutting discs one from another, whereby to permit the spacers of one rotor to be aligned with the cutting discs of the other rotor, and retaining means for releasably retaining said cutting discs and spacers in axial face-to-face engagement one with the other, the improvement comprising:

a drive segment keyed for rotation with its associated cutter drive shaft and having a plurality of peripherally spaced and radially outwardly opening pockets, each of said cutting discs comprising a set of cutter knives removably arranged one within each of said pockets, said spacers being removably carried by and encircling said segment, said cutter knives and said spacers having cooperating aperture and pin means for restraining said cutter knives against radial movement from within said pockets, while permitting sliding separating movement of said cutter knives from restraining engagement with said spacers in a direction axially of said cutter drive shaft, and said retaining means comprises means for releasably clamping adjacent ones of said spacers and said sets of cutter knives in axial face-to-face engagement for releasably preventing said sliding separating movement.

2. The improvement according to claim 1, wherein said spacers are of a generally ring-shaped configuration having radially inner edge portions removably received within said pockets for sliding movement axially of said cutter drive shaft.

3. The improvement according to claim 2, wherein at least two of said drive segments are carried for rotation with said cutter drive shaft, said cutter drive shaft has at least one key slot extending axially thereof and each of said drive segments has at least one key slot extending axially thereof, and said key slot of one of said drive segments is annularly displaced relative to said key slot of the other of said drive segments, thereby the respective pockets of said drive segments are annularly displaced relative to one another.

4. The improvement according to claim 2, wherein said retaining means includes abutment means disposed adjacent one end of said cutter drive shaft and a clamping nut threadably carried adjacent an opposite end of said cutter drive shaft for releasably clamping said cutter knives of each of said cutting discs against said spacers disposed axially adjacent thereto.

5. The improvement according to claim 2, wherein said pockets include abutment surfaces disposed to extend generally radially of an axis of rotation of said cutter drive shaft and to face in the direction of rotation thereof, and at least one of the engagement of said cutter knives with said abutments and said cooperating aperture and pin means couples said cutter knives to said drive segment for rotation therewith.

6. The improvement according to claim 1, wherein said spacers have radially outer peripheral surfaces disposed concentrically of said cutter drive shaft and radially inner edge portions received within said pockets, and said aperture and pin means comprises at least one aperture formed in each of said cutter knives and a plurality of pins projecting from said spacers for removable, slidable receipt one within each said aperture.

7. In a cutter rotor assembly for use in a comminution apparatus of the type having a pair of parallel intermeshing cutter rotors, the improvement wherein each of said cutter rotors comprises:

a cutter drive shaft adapted to be supported for rotation about an axis extending lengthwise thereof and having abutment means disposed adjacent one end thereof and a screw threaded portion disposed adjacent an opposite end thereof;

at least one drive segment arranged to encircle and be keyed for rotation with said cutter drive shaft and for relative sliding movement axially thereof;

at least one spacer ring arranged to encircle said drive segment and having a radially outer surface, a radially inner surface and oppositely facing radially extending abutment surfaces;

at least one set of cutter knives, said cutter knives having leading and trailing edges with respect to the direction of rotation of said cutter drive shaft, a radially outer cutting edge, a relatively inner edge and opposite side abutment surfaces, said cutter knives of each set being sized and arranged to lie in a coplanar relationship to define a cutting ring disposed normal to said axis and to encircle said drive segment with said leading and trailing edges of adjacent ones of said cutter knives being disposed at least in close proximity one to another and with said inner edge being disposed adjacent to said drive segment, said outer surface of said spacer ring being disposed radially intermediate said outer and inner edges of said cutter knives defining said cutting ring, said drive segment having an axial length at least substantially corresponding to the combined thickness of said spacer ring and cutting ring when said abutment surfaces thereof are disposed in engagement;

means for keying at least one of said spacer ring and said cutter knives of said cutting ring for rotation with said drive segment, while permitting movement axially thereof;

aperture and pin means for constraining said cutter knives individually against radial and annular rotational movement relative to said spacer ring while permitting separating movement axially of said drive shaft; and an adjustment nut engaging said screw threaded portion and cooperating with said abutment means to releasably clamp said abutment surfaces in engagement.

8. The improvement according to claim 7, wherein said means for keying at least one of said spacer ring and said cutter knives includes segment abutment surfaces extending essentially radially of said axis and said trailing edges of said cutter knives are arranged for engagement with said segment abutment surfaces.

9. The improvement according to claim 7, wherein said means for keying at least one of said spacer ring and said cutter knives includes segment abutment surfaces extending radially of said axis, and said radially inner surface of said spacer ring has trailing edges arranged for engagement with said segment abutment surfaces.

10. The improvement according to claim 7, wherein said aperture and pin means includes at least one aperture formed in each of said cutter knives and arranged to extend normal through at least one of said opposite side abutment surfaces thereof and a plurality of pins carried by said spacer ring and arranged to extend from one of said abutment surfaces thereof for removable, slidable receipt one within each of said apertures.

11. The improvement according to claim 7, wherein two or more of said spacer rings and said sets of cutter knives are arranged alternatively on said drive segment.

12. The improvement according to claim 7, wherein said means for keying at least one of said spacer ring and said cutter knives includes abutment surfaces defined by said drive segment to extend radially thereof and lengthwise of said axis, said radially inner surface of said spacer ring has trailing edges, and said abutment surfaces of said drive segment are arranged for engagement by said trailing edges of said spacer ring and said cutter knives.

13. In a cutter rotor assembly for use in a communition apparatus of the type having a pair of parallel intermeshing cutter rotors, the improvement wherein each of said cutter rotors comprises:

a cutter drive shaft adapted to be supported for rotation about an axis extending lengthwise thereof;

a plurality of spacer rings arranged to encircle said drive shaft and each having a radially outer surface, a radially inner surface and oppositely facing radially extending abutment surfaces;

a plurality of cutting discs arranged to encircle said drive shaft and placed alternately with said spacer rings axially of said drive shaft, each of said cutting discs comprising a set of cutter knives, said cutter knives having leading and trailing edges with respect to the direction of rotation of said cutter drive shaft, a radially outer cutting edge, a relatively inner edge and opposite side abutment surfaces, said cutter knives of each said set being sized and arranged to lie in a coplanar relationship to define a cutting ring disposed normal to said axis and to encircle said drive shaft with said leading and trailing edges of adjacent ones of said cutter knives being disposed at least in close proximity one to another, said outer surface of said spacer ring being disposed radially intermediate said outer and inner edges of said cutter knives defining said cutting ring;

means for keying at least one of said spacer rings and said cutter knives of said cutting discs for rotation with said drive shaft, while permitting movement thereof axially of said drive shaft;

aperture and pin means for constraining said cutter knives individually against radial and annular rotational movement relative an immediately adjacent one of said spacer rings while permitting sliding separating movement of said cutter knives relative to said adjacent one of said spacer rings in a direction axially of said drive shaft; and means for clamping said spacer rings and said cutting discs in a stack of rings and discs, wherein said abutment surfaces and side abutment surfaces of axially adjacent spacer rings and cutter knives are clamped in surface-to-surface engagement, and said means for clamping is releasable to permit said sliding separating movement of said cutter knives relative to said spacer rings.

14. The improvement according to claim 13, wherein both of said spacer rings and said cutter knives of said cutting discs are keyed for rotation with said drive shaft, while permitting movement thereof axially of said drive shaft.

15. The improvement according to claim 14, wherein said means for keying includes a drive segment keyed for rotation with said drive shaft and defining a plurality of pockets extending axially of said drive shaft and opening radially outwardly thereof in an annularly spaced relationship, said radial inner surface of each of said spacer rings and said relatively inner edge of said cutter knife of each said set engaging said drive segment within said pockets, while being movable relative to said drive segment axially of said drive shaft.

16. The improvement according to claim 13, wherein said aperture and pin means includes at least one aperture formed in each of said cutter knives and arranged to extend normal through at least one of said opposite side abutment surfaces thereof and a plurality of pins carried by said adjacent one of said spacer rings and arranged to extend from one of said abutment surfaces thereof for removable, slidable receipt one within each of said apertures.

* * * * *